(12) United States Patent
Kudo

(10) Patent No.: US 11,446,898 B2
(45) Date of Patent: Sep. 20, 2022

(54) COMPOSITE FOAM ARTICLE

(71) Applicant: Proprietect L.P., Toronto (CA)

(72) Inventor: Motonori Kudo, Macomb, MI (US)

(73) Assignee: Proprietect L.P., Toronto (CA)

( * ) Notice: Subject to any disclaimer, the term of this patent is extended or adjusted under 35 U.S.C. 154(b) by 0 days.

(21) Appl. No.: 16/978,803

(22) PCT Filed: Mar. 7, 2019

(86) PCT No.: PCT/IB2019/051863
§ 371 (c)(1),
(2) Date: Sep. 8, 2020

(87) PCT Pub. No.: WO2019/171329
PCT Pub. Date: Sep. 12, 2019

(65) Prior Publication Data
US 2021/0046730 A1 Feb. 18, 2021

Related U.S. Application Data

(60) Provisional application No. 62/639,889, filed on Mar. 7, 2018.

(51) Int. Cl.
| | |
|---|---|
| B32B 5/18 | (2006.01) |
| B32B 7/022 | (2019.01) |
| B32B 27/40 | (2006.01) |
| B60N 2/58 | (2006.01) |

(52) U.S. Cl.
CPC .............. *B32B 5/18* (2013.01); *B32B 7/022* (2019.01); *B32B 27/40* (2013.01);
(Continued)

(58) Field of Classification Search
None
See application file for complete search history.

(56) References Cited

U.S. PATENT DOCUMENTS

| | | | |
|---|---|---|---|
| 6,089,657 A * | 7/2000 | Banno | ...................... A47C 7/18 297/218.1 |
| 9,637,585 B2 | 5/2017 | Smiecinski et al. | |

(Continued)

FOREIGN PATENT DOCUMENTS

| | | |
|---|---|---|
| AU | 2003295757 A1 | 6/2004 |
| CN | 104797618 A | 7/2015 |

(Continued)

OTHER PUBLICATIONS

International Search Report for Application No. PCT/IB2019/051863 dated Jun. 18, 2019, 2 pages.

(Continued)

*Primary Examiner* — Chinessa T. Golden
(74) *Attorney, Agent, or Firm* — Howard & Howard Attorneys PLLC

(57) ABSTRACT

A composite foam article is disclosed herein. The composite foam article comprises a surface layer and a base layer with an interface therebetween. The surface layer comprises a high-resiliency polyurethane foam having an impact resilience of greater than about 50% when tested in accordance with ASTM D3574-17, and presents a seating surface. The base layer comprises a viscoelastic polyurethane foam having an impact resilience of less than about 50% when tested in accordance with ASTM D3574-17, and presents a mounting surface opposite the seating surface. The surface layer and the base layer are present in a thickness ratio of from about 17:3 to about 2:3.

22 Claims, 9 Drawing Sheets

(52) U.S. Cl.
CPC ....... *B32B 2307/56* (2013.01); *B32B 2307/72* (2013.01); *B60N 2/58* (2013.01)

(56) References Cited

U.S. PATENT DOCUMENTS

| | | |
|---|---|---|
| 10,427,571 B2 | 10/2019 | Stanciu et al. |
| 10,589,488 B2 | 3/2020 | Hojnacki et al. |
| 11,351,286 B2 | 6/2022 | Thompson, Jr. et al. |
| 2004/0109992 A1 | 6/2004 | Gribble et al. |
| 2012/0238656 A1* | 9/2012 | De Kesel ............... C08G 18/14 521/137 |
| 2015/0119837 A1 | 4/2015 | Thompson, Jr. et al. |
| 2015/0314715 A1 | 11/2015 | Kilgore et al. |
| 2015/0336306 A1 | 11/2015 | Hahn et al. |
| 2017/0113586 A1 | 4/2017 | Galbreath et al. |

FOREIGN PATENT DOCUMENTS

| | | |
|---|---|---|
| CN | 106660299 A | 5/2017 |
| CN | 107158445 A | 9/2017 |
| EP | 2932871 A1 | 10/2015 |
| JP | 2015517874 A | 6/2015 |
| WO | 2014186866 A1 | 11/2014 |
| WO | 2016134479 A1 | 9/2016 |

OTHER PUBLICATIONS

European Search Report for Application EP 19 76 3833 dated Oct. 26, 2021, 2 pages.
English language abstract for CN 104797618 A extracted from espacenet.com database on Jun. 13, 2022, 2 pages.
English language abstract for CN 106660299 A extracted from espacenet.com database on Jun. 13, 2022, 2 pages.
English language abstract for AU 2003295757 A1 extracted from espacenet.com database on Jun. 29, 2022, 2 pages.
English language abstract for CN 107158445 A extracted from espacenet.com database on Jun. 29, 2022, 2 pages.
English language abstract for JP 2015-517874 A extracted from espacenet.com database on Jun. 29, 2022, 2 pages.

* cited by examiner

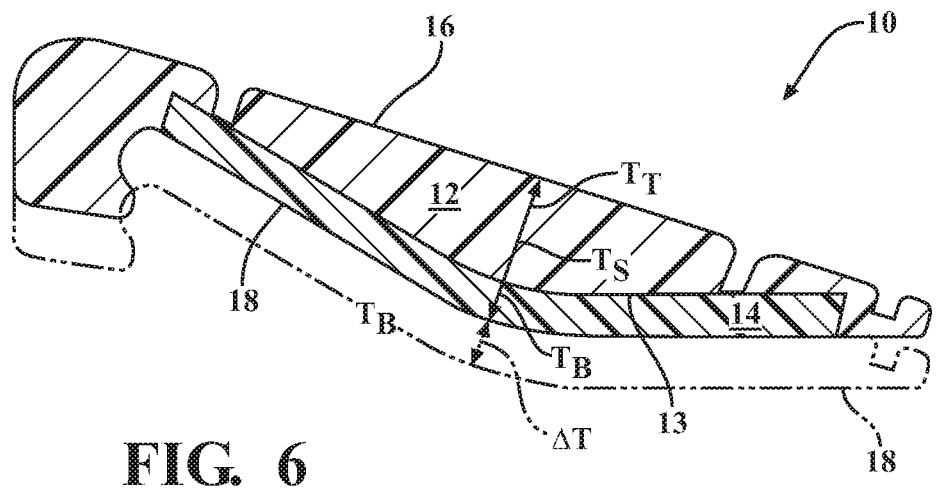
FIG. 6
FIG. 7
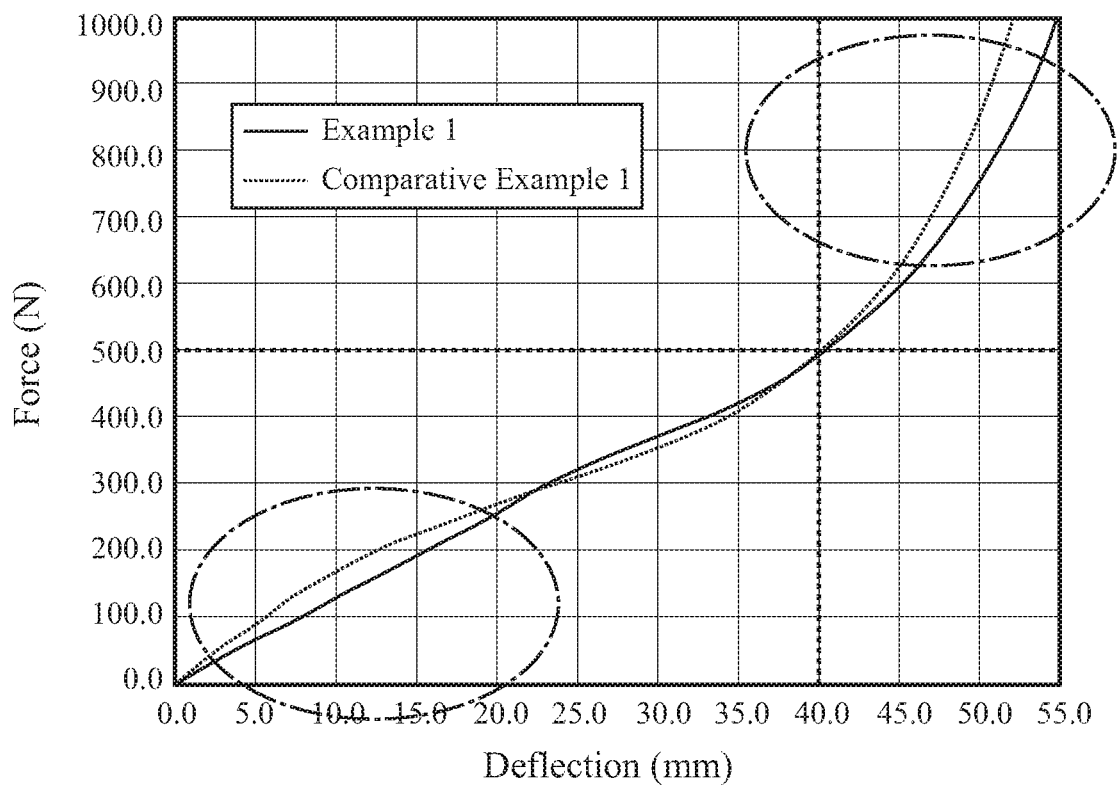

COMPOSITE FOAM ARTICLE

CROSS-REFERENCE TO RELATED APPLICATIONS

The present application is the National Stage of International Patent Application No. PCT/IB2019/051863, filed on Mar. 7, 2019, which claims priority to and all of the benefits of U.S. Provisional Patent Application No. 62/639,889, filed on Mar. 7, 2018, which are hereby expressly incorporated herein by reference in their entirety.

FIELD OF THE DISCLOSURE

The subject disclosure generally relates to a composite foam article comprising two or more polyurethane foam layers. The composite foam article can be used in automotive seating applications.

DESCRIPTION OF THE RELATED ART

Improvement of "comfort" in vehicle seating, such as automotive and motorcycle seating, has received attention in recent years. Global demands for improved performance from seat makers and OEMs have forced a reexamination of many aspects of seat design. This includes seats that use cushions formed from polyurethane articles, such as a polyurethane foam. In some cases, such demands are driven by the desire to reduce the thickness of the cushion to increase space and reduce weight while achieving the same performance as the original seat.

Further, to obtain a comfortable feeling, it is effective to remarkably dampen the vibration in a frequency range that makes riders feel uncomfortable while being exposed to road vibrations, e.g. while riding on a motorcycle on a highway. Other sources of discomfort with respect to the seat include points of high pressure at the interface between the rider and the seat, in addition to inadequate support and/or a hard feel to the seat.

Vehicular seats are typically manufactured with polyurethane foam. Such polyurethane foam is formulated for resiliency to provide passenger comfort and optimal damping/minimal vibration transmissability. Flexible polyurethane foams, in particular high resiliency (HR) polyurethane foams, are typically used in vehicular seating applications.

As is understood in the art, when used in vehicular seating applications, HR polyurethane foam typically has an impact resilience (i.e., ball rebound) greater than 50%. As is also understood in the art, when used in vehicular applications, HR polyurethane foam must be used at certain thicknesses to accommodate passengers of various sizes and weights to provide adequate comfort and support in seating applications.

There is a need for improved polyurethane foams and polyurethane foam articles, i.e., seating elements, which provide excellent comfort and support properties as well as damping properties at minimal thickness and weight.

SUMMARY OF THE DISCLOSURE AND ADVANTAGES

The subject disclosure provides a composite foam article. The composite foam article comprises a surface layer and a base layer with an interface therebetween. The surface layer presents a seating surface, and the base layer presents a mounting surface opposite the seating surface of the surface layer. The surface layer comprises a high-resiliency polyurethane foam having an impact resilience of greater than about 50% when tested in accordance with ASTM D3574-17. The base layer comprises a viscoelastic polyurethane foam having an impact resilience of less than about 50% when tested in accordance with ASTM D3574-17. The surface layer and the base layer are present in a thickness ratio of from about 17:3 to about 2:3.

The composite foam article of the subject invention, with the surface layer comprising a relatively hard high resiliency (HR) polyurethane foam and the base layer comprising a relatively soft viscoelastic (VE) polyurethane foam, surprisingly provides excellent comfort and support properties for a wide variety of passengers in various vehicular applications and at various conditions. As such, the composite foam article of this disclosure provides improved performance over single layer foam articles in seating applications and allows for a reduction in the thickness of the foam article necessary to provide adequate comfort and support properties for a wide variety of passengers in various vehicular applications and at various conditions.

BRIEF DESCRIPTION OF THE DRAWINGS

The advantages of the present disclosure will be readily appreciated as the same becomes better understood by reference to the following detailed description when considered in connection with the accompanying drawings. It is to be understood that the drawings are purely illustrative and are not necessarily drawn to scale.

FIG. 6 is a cross-sectional view of the composite foam article comprising a surface layer and a base layer, which is utilized for testing in the examples.

FIG. 7 is a graphical analysis of force vs. deflection of the composite foam article of FIG. 6.

DETAILED DESCRIPTION OF THE DISCLOSURE

Figure 1:
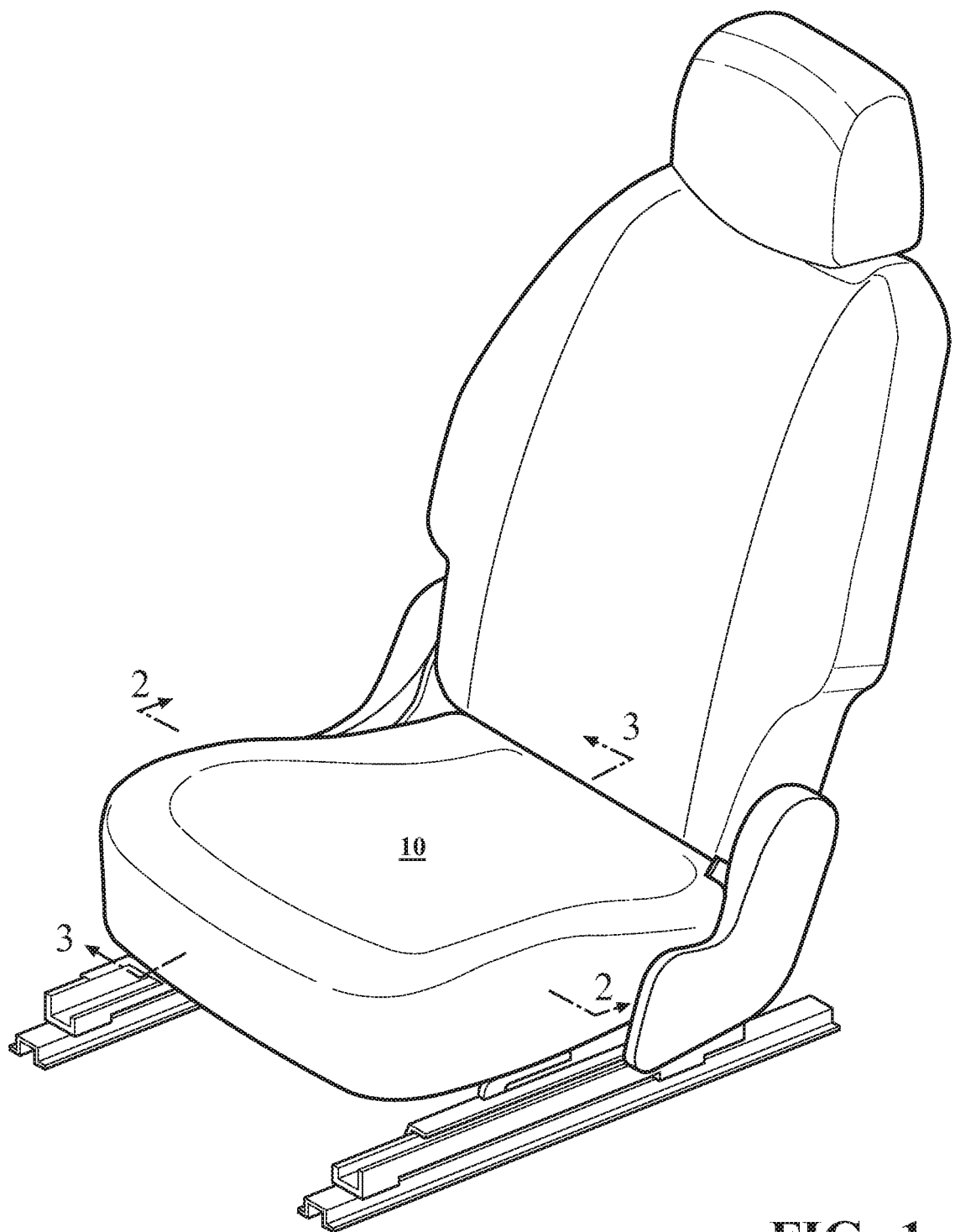
FIG. 1 is a perspective view of an automotive seat including a composite foam article comprising a surface layer and a base layer.

A composite foam article is disclosed herein and generally shown at 10 throughout the Figures. The composite foam article 10 comprises a surface layer 12 and a base layer 14. The surface layer 12 presents a seating surface 16, and the base layer 14 presents a mounting surface 18 opposite the seating surface 16 of the surface layer 12. Both the surface layer 12 and the base layer 14 comprise polyurethane foam. The surface layer 12 comprises a high resiliency ("HR") polyurethane foam and the base layer 14 comprises a viscoelastic ("VE") polyurethane foam.

The composite foam article 10 of the subject disclosure is particularly useful in the automotive industry, e.g. for use in automotive seating. In automotive seating applications, the composite foam article 10 provides comfort and support at reduced thicknesses.

The composite foam article 10 is also suitable for use in the furniture industry, e.g. for use in bedding (e.g. mattresses) and seating (e.g. cushions, arm rests, etc.) applications. However, the composite foam article 10 of the subject disclosure is not limited to use in automotive and furniture industries. As one example, the composite foam article 10 is suitable for use in sporting equipment, such as hockey or football equipment.

Figure 2:
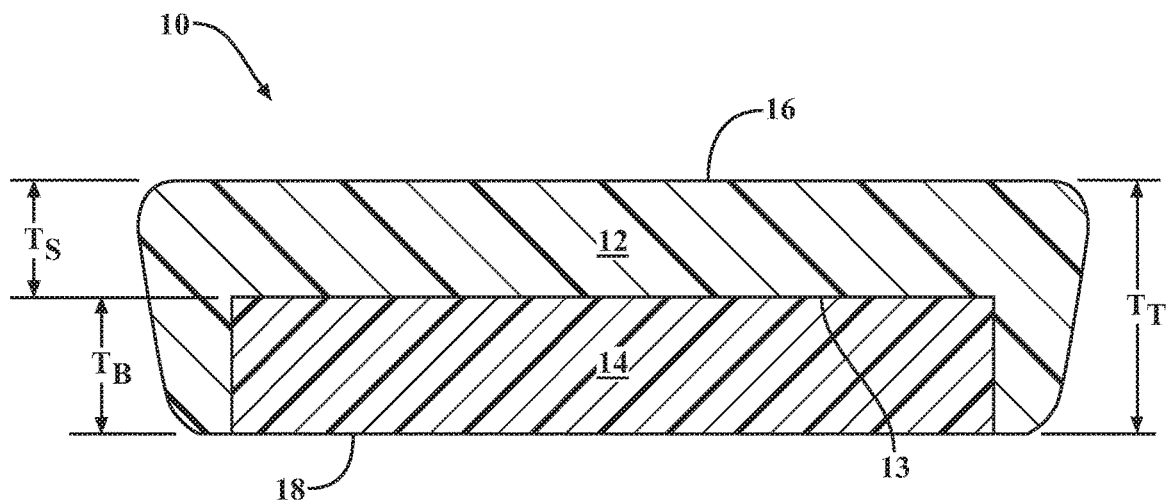
FIG. 2 is a cross-sectional view of the composite foam article of FIG. 1 along Line 2-2.
Figure 3:
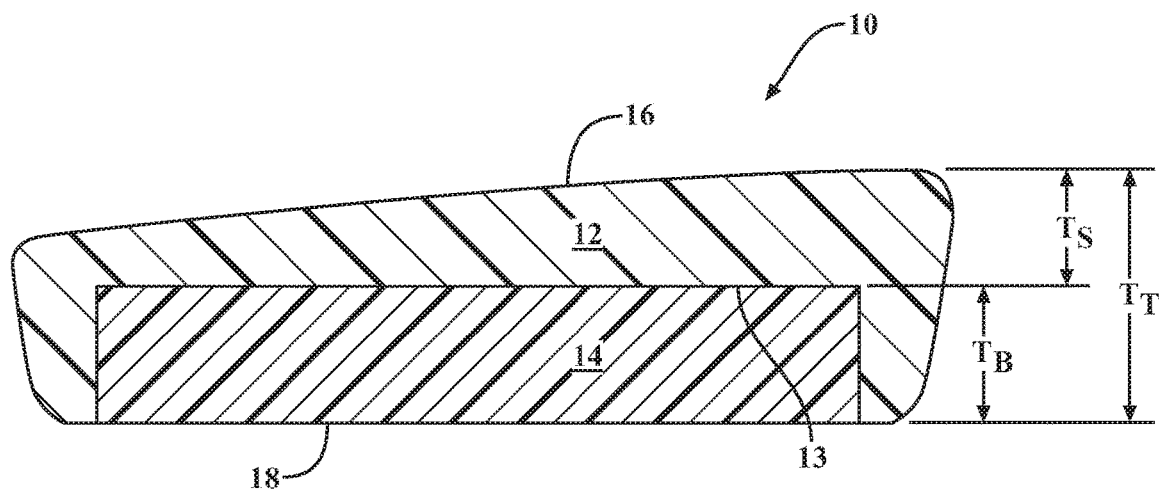
FIG. 3 is a cross-sectional view of the composite foam article of FIG. 1 along Line 3-3.

Referring now to FIG. 1, a perspective view of an automotive seat (captain's chair/bucket seat) including a composite foam article 10 comprising a surface layer 12 and a base layer 14 is illustrated. FIG. 2 is a cross-sectional view of the composite foam article 10 of FIG. 1 along Line 2-2 and FIG. 3 is a cross-sectional view of the composite foam article 10 of FIG. 1 along Line 3-3.

Figure 4:
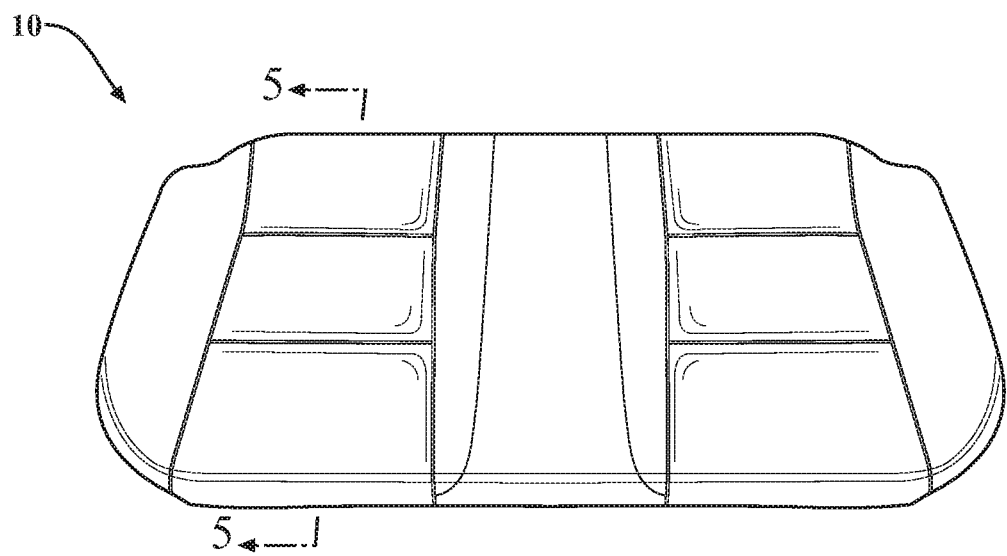
FIG. 4 is a perspective view of an embodiment of the composite foam article comprising a surface layer and a base layer.
Figure 5:
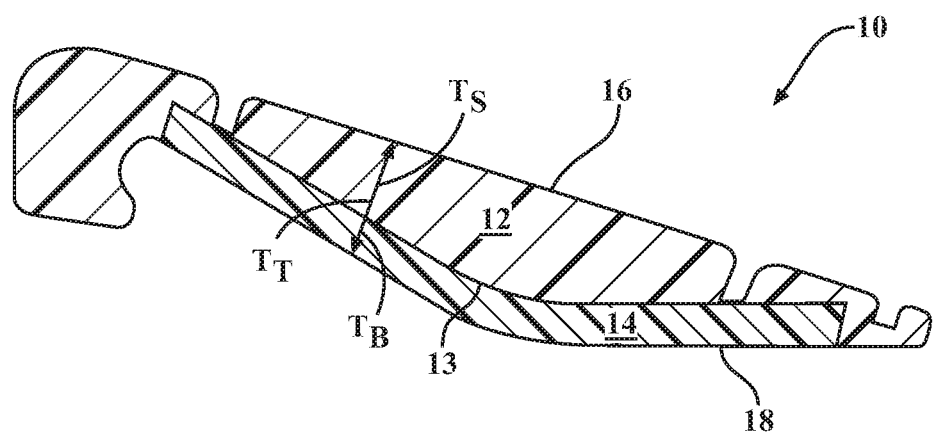
FIG. 5 is a cross-sectional view of the composite foam article of FIG. 4 along Line 5-5.

Referring now to FIG. 4, a perspective view of an embodiment of the composite foam article 10 (seat bottom for a back/bench seat) comprising a surface layer 12 and a base layer 14 is illustrated. FIG. 5 is a cross-sectional view of the composite foam article 10 of FIG. 4 along Line 5-5.

As set forth above, the surface layer 12 comprises an HR polyurethane foam. As used herein, the terminology "HR polyurethane foam" denotes a particular class of polyurethane foam and stands in contrast to other flexible polyurethane foams, e.g. conventional flexible polyurethane foams, viscoelastic polyurethane foam. HR polyurethane foams are typically an open-celled, flexible polyurethane foam that has a somewhat random cell structure which helps add support, comfort, and resilience or bounce in seating applications.

Further, HR polyurethane foams have a high support factor and greater surface resilience, i.e., recovers and bounces back to its original shape immediately after compression.

In some embodiments, the HR polyurethane foam of the surface layer 12 has a support factor of from about 2 to about 3, or about 2 to about 2.8 (ratio of 65% ILD to 25% ILD) and an impact resilience (i.e., ball rebound) of greater than about 50, about 51, about 52, about 53, about 54, about 55, about 56, about 57, about 58, about 59, about 60, about 61, about 62, about 63, about 64, or about 65, % (and typically less than 70% or 80%) when tested in accordance with ASTM D3574-17. Alternatively, in some embodiments, the HR polyurethane foam of the surface layer 12 has an impact resilience (i.e., ball rebound) of from about 50 to about 70, or from about 52 to about 65, % when tested in accordance with ASTM D3574-17. In various non-limiting embodiments, all values and ranges of values including and between those described above are hereby expressly contemplated for use herein.

The HR polyurethane foam of the surface layer 12 typically has a density of from about 40 to about 80, from about 45 to about 70, or from about 45 to about 60, kg/m$^3$ when tested in accordance with ASTM D3574-17. In various non-limiting embodiments, all values and ranges of values including and between those described above are hereby expressly contemplated for use herein.

Although density is not a measure of firmness, stiffness, or load bearing capacity, such properties can be characterized by Indentation Load Deflection ("ILD") and Compression Force Deflection ("CFD"). The HR polyurethane foam of the surface layer 12 has: an ILD of from about 300 to about 600, from about 375 to about 525, or from about 400 to about 500, N/314 cm$^2$ when tested in accordance with ASTM D3574; and/or a CFD of from about 5 to about 10, or from about 6 to about 9, or from about 6.5 to about 8, kPa when tested in accordance with ASTM D3574. In various non-limiting embodiments, all values and ranges of values including and between those described above are hereby expressly contemplated for use herein.

As is known in the art, HR polyurethane foams are produced via the chemical reaction of polyols and polyisocyanates in the presence of a blowing agent, e.g. water. More specifically, the HR polyurethane foam is formed via an exothermic reaction of an isocyanate-reactive resin composition (including polyols) and an isocyanate in the presence of a blowing agent. The isocyanate-reactive resin composition, the isocyanate, and the blowing agent, are collectively known as a polyurethane system. Suitable HR polyurethane foams and systems are commercially available from The Woodbridge Group of Woodbridge, ON.

As set forth above, the base layer 14 comprises a VE polyurethane foam. Throughout this application and the accompanying drawings and exhibits, VE polyurethane foam and ADP (for AdaptiPedic™) polyurethane foam are used interchangeably. As used herein, the terminology "VE polyurethane foam" denotes a particular class of polyurethane foam and stands in contrast to other flexible polyurethane foams, e.g. conventional flexible polyurethane foams, high resiliency polyurethane foam.

As is known in the art, a viscoelastic foam exhibits slower recovery when a compression force is released than do other resilient polyurethane foams. For example, after being released from compression, an HR polyurethane foam at room temperature and standard atmospheric conditions generally recovers to its full uncompressed height or thickness in one second or less. By contrast, a VE polyurethane foam of the same density and thickness, and at the same temperature and atmospheric conditions, will take significantly longer to recover, e.g. from two to sixty seconds. VE polyurethane foams also exhibit ball rebound values of generally less than about 25% as compared to about 40% or more for other polyurethane foams.

That is, VE polyurethane foams exhibit slow recovery, and thus high hysteresis, during a compression cycle and also typically have low ball rebound values. More specifically, VE polyurethane foams exhibit ball rebound values of generally less than about 25% as compared to about 40% or more for other flexible polyurethane foams. These physical properties may result from either low airflow, as the recovery is limited by the rate of air re-entering the viscoelastic polyurethane foam, or by other physical properties of the polyurethane foam. While most of the physical properties of VE polyurethane foams resemble those of conventional polyurethane foams, the resilience of viscoelastic polyurethane foams is much lower. Polyurethane foams having these physical properties (viscoelastic properties) also typically provide excellent comfort and support properties in various bedding and seating applications.

VE polyurethane foam can be defined or characterized by its one or more glass transition temperatures ("$T_g$") which can be determined or measured via dynamic mechanical analysis. Conventional polyurethane foams, e.g. including flexible polyurethane foams such as HR polyurethane foams, based on a 3000 molecular weight polyether triol, generally have $T_g$'s below −30° C., and possibly even below −50° C. In contrast, VE polyurethane foams have $T_g$'s above −20° C. In light of the higher $T_g$'s and other physical properties of VE polyurethane foams described above, the recovery time of VE polyurethane foams can be sensitive to temperature changes within a range close to standard room temperature. In a preferred embodiment, the VE polyurethane has a single $T_g$ at a temperature of from about −20 to about 20° C., or from about −10 to about 0° C. wherein the $T_g$ is determined from the maximum of the tan delta using Dynamic Mechanical Analysis.

The VE polyurethane foam of the base layer 14 typically has a density of from about 40 to about 70, from about 50 to about 65, from about 45 to about 60, from about 50 to about 60, or from about 55 to about 60, kg/m$^3$ when tested in accordance with ASTM D3574-17. In many embodiments, the surface layer 12 has a greater density than the base layer 14. In various non-limiting embodiments, all values and ranges of values including and between those described above are hereby expressly contemplated for use herein. Further, the VE polyurethane foam of the base layer 14 has: an ILD of from about 50 to about 200, from about 100 to about 175, or from about 115 to about 160, N/314 cm$^2$; and/or a CFD of from about 1 to about 5, or from about 2 to about 4, or from about 2.5 to about 3.5, kPa when tested in accordance with ASTM D3574-17. In various non-limiting embodiments, all values and ranges of values including and between those described above are hereby expressly contemplated for use herein.

In some embodiments, the VE polyurethane foam has an impact resilience (i.e., ball rebound) of less than about 50, about 40, about 35, about 30, or about 25, % (and typically greater than about 5%) when tested in accordance with ASTM D3574-17. In some such embodiments, the VE polyurethane foam has an impact resilience of from about 10 to about 40, or from about 15 to about 35, % when tested in accordance with ASTM D3574-17. In various non-limiting embodiments, all values and ranges of values including and between those described above are hereby expressly contemplated for use herein.

In some embodiments, the VE polyurethane foam has a $T_g$ above about −25, −20, or −15, ° C. In various non-limiting embodiments, at least one $T_g$ of the VE polyurethane foam can be between −25 and 50° C., and all values and ranges of values for $T_g$ between −25 and 50° C. are hereby expressly contemplated for use herein.

As is known in the art, VE polyurethane foams are produced via the chemical reaction of polyols and polyisocyanates in the presence of a blowing agent, e.g. water. More specifically, the VE polyurethane foam is formed via an exothermic reaction of an isocyanate-reactive resin composition (including polyols) and an isocyanate in the presence of a blowing agent. The isocyanate-reactive resin composition, the isocyanate, and the blowing agent, are collectively known as a polyurethane system. Suitable VE polyurethane foams and systems are commercially available from The Woodbridge Group of Woodbridge, ON under the trade name AdaptiPedic™.

Various embodiments of the HR polyurethane foam of the surface layer 12 of the composite foam article 10 and the VE (or ADP) foam of the base layer 14 of the composite foam article 10 described herein are further described in PCT/CA2016/050199, the contents of which are included in their entirety herein.

Referring again to FIG. 2, a cross-sectional view of the composite foam article 10 including the surface layer 12 that comprises the HR polyurethane foam and presents the seating surface 16, and the base layer 14 that comprises VE polyurethane foam and presents the mounting surface 18 opposite the seating surface 16 of the base layer 14 is illustrated. The composite foam article 10 includes an interface 13 between the surface layer 12 and the base layer 14. In some embodiments, the interface 13 is described as narrow or distinct, e.g. as it is in embodiments where the layers 12 and 14 are pre-formed and bonded together (e.g. with adhesive), or molded with a method that produces a distinct transition. In other embodiments, the interface 13 can be described as wide (as described further below) in embodiments where there is not a distinct transition between the surface layer 12 comprising the HR polyurethane foam and the base layer 14 comprising the VE polyurethane foam. In embodiments where the interface 13 is described as wide, there is overlap between the HR polyurethane and the VE polyurethane foam (which can be described as a blended sub-layer) at the interface 13, which can result in excellent bonding between the layers and other advantageous properties. In such embodiments, where the interface 13 is described as wide, the interface 13 can be described as a sub-layer having a thickness of from about 0.1 to about 5, or about 0.1 to about 2, mm, and all values and ranges between about 0.1 and about 5 mm are hereby expressly contemplated for use herein.

In one embodiment, the method of making the composite foam article 10 includes over molding either the surface layer 12 or the base layer 14. That is, the method includes the steps of: molding the surface layer 12 comprising a high-resiliency (HR) polyurethane foam in a first mold; inserting the molded surface layer into a second mold; and molding the base layer 14 comprising a viscoelastic (VE) polyurethane foam in the second mold. Of course, the base layer 14 can be molded first and the surface layer over molded.

It should be appreciated that the composite foam article 10 can include additional layers. For example, embodiments of the composite foam article 10 including additional HR and VE foam layers are envisioned and contemplated herein.

In some embodiments, the surface layer 12 (comprising HR foam) and the base layer 14 (comprising VE foam) are present in a thickness ratio (thickness of the surface layer 12 ($T_S$):the thickness of the base layer 14 ($T_B$)) of from about 85:15 to about 40:60, or preferably from about 75:25 to about 50:50, based on the total thickness ($T_T$) of the composite foam article 10. Of course, this can be simply characterized as a thickness ration of from about 17:3 to about 2:3, from about 3:1 to about 1:1, or from about 9:5 to about 4:3. In various non-limiting embodiments, all values and ranges of values including and between those described above are hereby expressly contemplated for use herein.

It should be appreciated that the total thickness ($T_T$), the thickness of the surface thickness ($T_S$), and the thickness of the base ($T_B$), can be calculated on any particular vertical cross-section of the composite article 10. Each vertical cross-section may be taken at a 90° angle relative to the interface 13.

In various embodiments, the surface layer 12 is present such that the first value of the thickness ratio ($T_S$) is from about 85 to about 40, about 80 to about 45, about 75 to about 50, about 70 to about 55, about 68 to about 58, or about 65 to about 60, and the base layer 14 is present such that the second value of the thickness ratio ($T_B$) is from about 15 to about 60, about 20 to about 55, about 25 to about 50, about 30 to about 45, about 32 to about 42, or about 55 to about 60 ($T_S$:$T_B$). In various non-limiting embodiments, all values and ranges of values including and between those described above are hereby expressly contemplated for use herein.

Alternatively, in some embodiments, the base layer 14 (comprising VE foam) is present in the composite foam article 10 at a thickness ($T_B$) of from about 15 to about 60, or preferably from about 25 to about 50, % based on the total thickness ($T_T$) of the composite foam article 10, and the surface layer 12 (comprising HR foam) is present in the composite foam article 10 at a thickness ($T_B$) of from about 40 to about 85, or preferably from about 50 to about 75, % based on the total thickness ($T_T$) of the composite foam article 10. In various non-limiting embodiments, all values and ranges of values including and between those described above are hereby expressly contemplated for use herein.

In some embodiments, the total thickness ($T_T$) of the composite foam article 10 (the cumulative thickness of the surface layer 12 (comprising HR foam) and the base layer 14 (comprising VE foam) is less than about 95, less than about 90, less than about 85, less than about 80, less than about 75, less than about 70, mm and greater than about 40, greater than about 50, greater than about 60, or greater than about 70, mm. In various non-limiting embodiments, all values and ranges of values including and between those described above are hereby expressly contemplated for use herein.

In some embodiments, the composite foam article 10 has a spring rate of less than about 20, less than about 19.5, less than about 19, less than about 18.5, less than about 18, from about 10 to about 20, from about 12 to about 19.5, from about 13 to about 19, or from about 14 to about 18.5, N/mm when tested at a thickness of 70 mm and a thickness ratio (surface layer 12:base layer 14) of from about 17:3 to about 2:3 and in accordance with ASTM 3574-17 (sample size: 400×400×70; initial thickness speed: 50 mm/min; pre-compression speed: 50 mm/min; number of pre-compressions: 1-75%; saturation time after pre-compression: 60 sec; compression speed: 50 mm/min; measurement point: 25, 50, and 65%; and saturation time: 20 sec).

In many embodiments, the composite foam article 10 has a support factor of from about 0.4 to about 3.0, or from 0.5 to about 2.8, N/mm$^2$ when tested at a thickness of 70 mm and a thickness ratio (surface layer 12:base layer 14) of from about 17:3 to about 2:3 and in accordance with ASTM D3574-17. The following testing parameters were utilized with ASTM D3574-17 (sample size: 400×400×70; initial thickness speed: 50 mm/min; pre-compression speed: 50 mm/min; number of pre-compressions: 1-75%; saturation time after pre-compression: 60 sec; compression speed: 50 mm/min; measurement point: 25, 50, and 65%; and saturation time: 20 sec). In various non-limiting embodiments, all values and ranges of values including and between those described above are hereby expressly contemplated for use herein.

Surprisingly, the composite foam article 10 exhibits excellent comfort and support properties having a surface layer 12 comprising HR polyurethane foam (having a higher support factor) and a base layer 14 comprising viscoelastic foam (having a lower support factor). This arrangement of layers is counter-intuitive since the VE polyurethane foam is not arranged on the seating surface upon which the occupant sits but beneath a layer of HR polyurethane foam. In many embodiments, the surface layer 12 comprising HR polyurethane foam has a higher support factor and a base layer 14 comprising VE foam having a lower support factor provides excellent comfort and damping performance at decreased thicknesses.

Further, the composite foam article 10 typically has a damping value of from greater than about 1.0 to about 2.5, or about 1.2 to about 2, when tested in accordance with ISO 3386-1: 1986 and at a thickness of 70 mm and with a thickness ratio (surface layer 12:base layer 14) of from about 17:3 to about 2:3.

In various embodiments, the composite foam article 10 is included in vehicular seating applications, such as an automotive or aerospace (e.g. airplane) seating application. To this end, the polyurethane foam article 10 may be a seating element and referred to as such. As used throughout this disclosure, the term "seat element" is used in connection with one, some or all of a cushion (i.e., the portion of the seat on which the occupant/passenger sits), a back or back rest (i.e., the portion of the seat which supports the back of the occupant/passenger) and a side bolster (i.e., the extension of the cushion, back or the back rest, which laterally supports the occupant/passenger).

As is known in the automotive and aerospace industries, a "seat" includes both a cushion and a back (or back rest). Thus, as used herein, the term "seat element" includes a cushion, a back (or back rest) or a unit construction comprising a cushion and a back (or back rest).

The following examples are intended to illustrate the present disclosure and are not to be read in any way as limiting to the scope of the present disclosure.

EXAMPLES

The polyurethane seat cushions of Example 1 and Comparative Example 1 are described herein.

The seat cushion of Example 1 is a composite foam article formed in accordance with the subject disclosure. The composite article comprises a surface layer comprising a high-resiliency (HR) polyurethane foam that presents a seating surface, and a base layer comprising a viscoelastic (VE) polyurethane foam that presents a mounting surface opposite the seating surface. To form the composite article of Example 1 the surface layer is molded, the base layer is molded, and the surface and the base layers are adhered to one another with an adhesive at an interface between the surface layer and the base layer.

Comparative Example 1 is a single piece polyurethane foam article formed with HR polyurethane foam. As such, Comparative Example 1 is not formed in accordance with the subject disclosure.

Referring now to FIG. 6, a cross-sectional view of the composite foam article of Example 1 is illustrated. The composite foam article is a seating element, more specifically a seat cushion (i.e., the portion of the seat on which the occupant sits). Still referring to FIG. 6, the hashed outline (shown at 18) represents a cross-sectional view of the foam article/seat cushion of Comparative Example 1.

As is illustrated with the hashed line (ghost line) in FIG. 6, Example 1 provides a significant reduction in thickness over Comparative Example 1. Despite this reduction in thickness, Example 1 provides improved occupant/passenger comfort and vehicle acoustics.

Still referring to FIG. 6, the composite foam article of Example 1 has a total thickness ($T_T$) of 69 mm at center, while the foam article of Comparative Example 1 has a total thickness ($T_T$) of 94 mm at center. Example 1 is, from the front of the seat cushion all the way to the back of the seat cushion, 25 mm less thick than Comparative Example 1. Further, the composite foam article of Example 1 has a mass of 0.95 kg while the foam article of Comparative Example 1 has a mass of 1.30 kg. That is, Comparative Example 1 is 36.8% by weight heavier than the seat cushion of Example 1. The decreased thickness and weight of Example 1 represents additional vehicle storage options and reduced mass, to name but a few advantages.

FIG. 7 is a graphical analysis of force vs. deflection of the composite foam article of Example 1 and the foam article of Comparative Example 1 (sample size 400×400 mm) tested on a Zwick Static Materials Testing Machine at 500N in accordance with ASTM D3574-17. In view of the circled portions on FIG. 7, the composite foam article (seat cushion)

of Example 1 demonstrates improved initial softness and comfort for occupants/passengers over the composite foam article (seat cushion) of Comparative Example 1.

Figure 8:
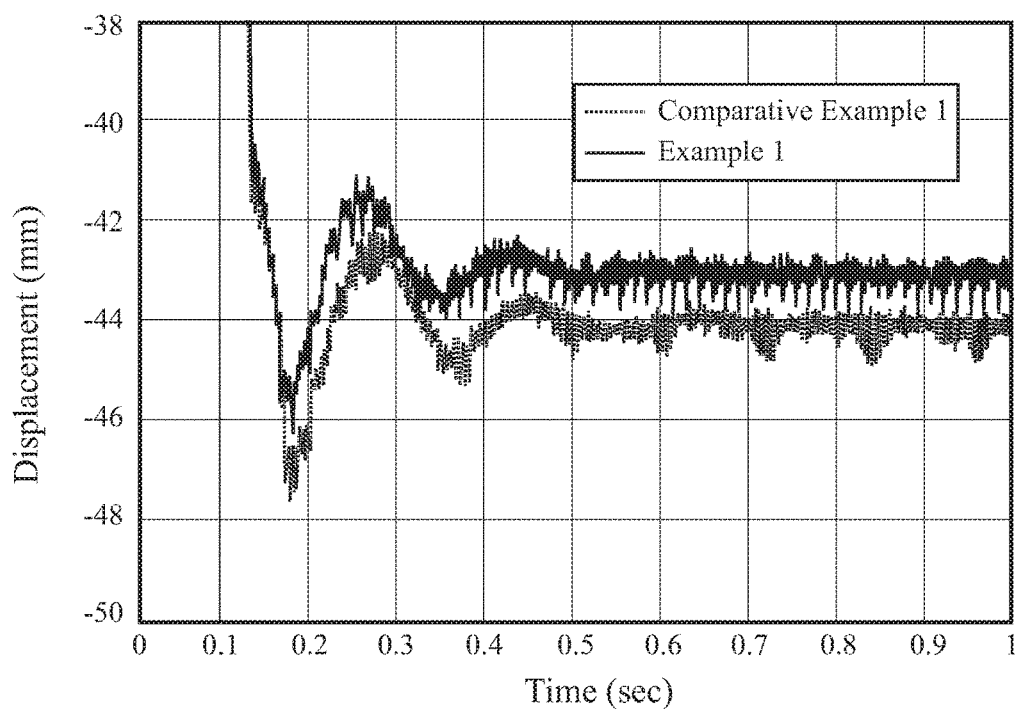
FIG. 8 is a graphical analysis of displacement vs. time of the composite foam article of FIG. 6.

FIG. 8 is a graphical analysis of displacement vs. time of the composite foam article of Example 1 and the foam article of Comparative Example 1. Further, this test is a modification of the standard damping test to "Damping test after 1G" in which a 50 kg weight is placed on top of a foam test sample with a Tekken plate and then a 20 kg weight is dropped on top of the 50 kg weight from a drop height of 20 mm Example 1 has a damping factor of 1.42 at 40 mm and 50 kg while Comparative Example 1 has a damping factor of 0.99 at 40 mm and 50 kg.

Damping Factor is calculated by calculating a logarithmic decrement defined as the natural log of the ratio of the amplitudes of any two successive peaks:

$$\delta = \frac{1}{n} \ln \frac{x(t)}{x(t+nT)}$$

where x(t) is the amplitude at time t, and x(t+nT) is the amplitude of the peak n periods away, where n is any integer number of successive, positive peaks.

The damping ratio is then found from the logarithmic decrement by:

$$\zeta = \frac{1}{\sqrt{1+\left(\frac{2\pi}{\delta}\right)^2}}$$

FIG. 8 indicates that Example 1 exhibits excellent damping performance relative to Comparative Example 1.

Figure 9:
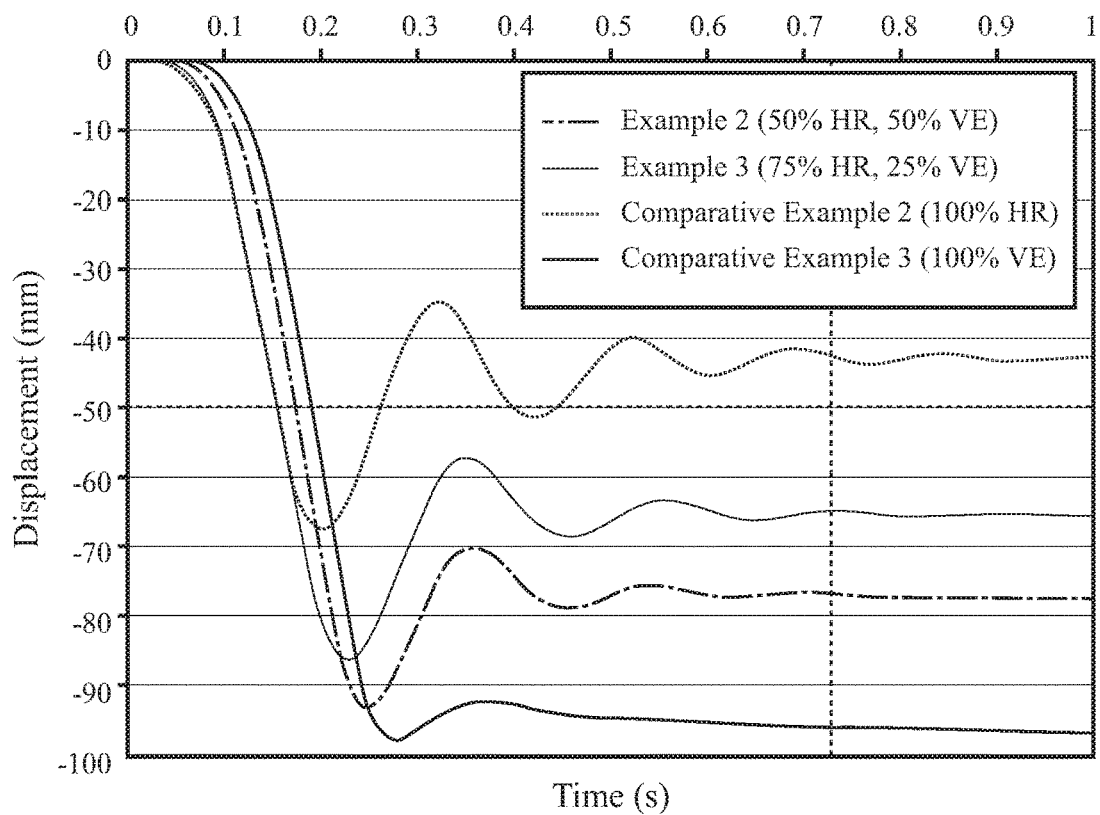
FIG. 9 is a graphical analysis of displacement vs. time of various embodiments of the composite foam article of the subject disclosure.

FIG. 9 is a graphical analysis of displacement vs. time of the composite foam article of Examples 2 and 3. The composite foam article of Example 2 includes a surface layer comprising HR foam having a thickness of 50% and a base layer comprising VE foam having a thickness of 50%, based on a total thickness of the test sample (i.e. a 1:1 thickness ratio). The composite foam article of Example 3 includes a surface layer comprising HR foam at a thickness of 75% and a base layer comprising VE foam at a thickness of 25%, based on a total thickness of the test sample. FIG. 9 also includes a graphical analysis of the foam articles of Comparative Examples 2 and 3, which include 100% HR and 100% VE foam respectively, and are of the same sample size as Examples 2 and 3. This testing is conducted with a Tekken plate and a 50 kg weight at a drop height of 35 mm on a Schap Jounce Tester in accordance with ASTM D3574-17 (sample size: 400×400×70; initial thickness speed: 50 mm/min; pre-compression speed: 50 mm/min; number of pre-compressions: 1-75%; saturation time after pre-compression: 60 sec; compression speed: 50 mm/min; measurement point: 25, 50, and 65%; and saturation time: 20 sec). As the thickness of the VE layer increases, the damping performance of the composite article increases. The damping and comfort properties of the composite foam article is excellent when the base layer comprising VE foam is included at a thickness of from 25 to 50%, based on a total thickness of the composite foam article.

Examples 4-6 shown in Table 1 below are composite foam articles formed in accordance with the subject disclosure having a thickness of 70 mm Example 4 includes a 60 mm surface layer comprising HR foam and a 10 mm base layer comprising VE foam. Example 5 includes a 55 mm surface layer comprising HR foam and a 15 mm base layer comprising VE foam. Example 6 includes a 50 mm surface layer comprising HR foam and a 20 mm base layer comprising VE foam. A description of Examples 4-6 and Comparative Example 4 is set forth in Table 1 below.

TABLE 1

|  | Surface Layer $T_{HR}$ (mm) | Surface Layer CFD (MPa) | Base Layer $T_{VE}$ (mm) | Base CFD (MPa) | VE:HR Ratio |
|---|---|---|---|---|---|
| Example 4 | 60 | 6.65 | 10 | 2.7 | 0.17 |
| Example 5 | 55 | 7.00 | 15 | 2.7 | 0.27 |
| Example 6 | 50 | 7.50 | 20 | 2.7 | 0.4 |
| Comp. Ex. 4 | 70 | 5.75 | 0 | N/A | 0 |

Figure 10A:
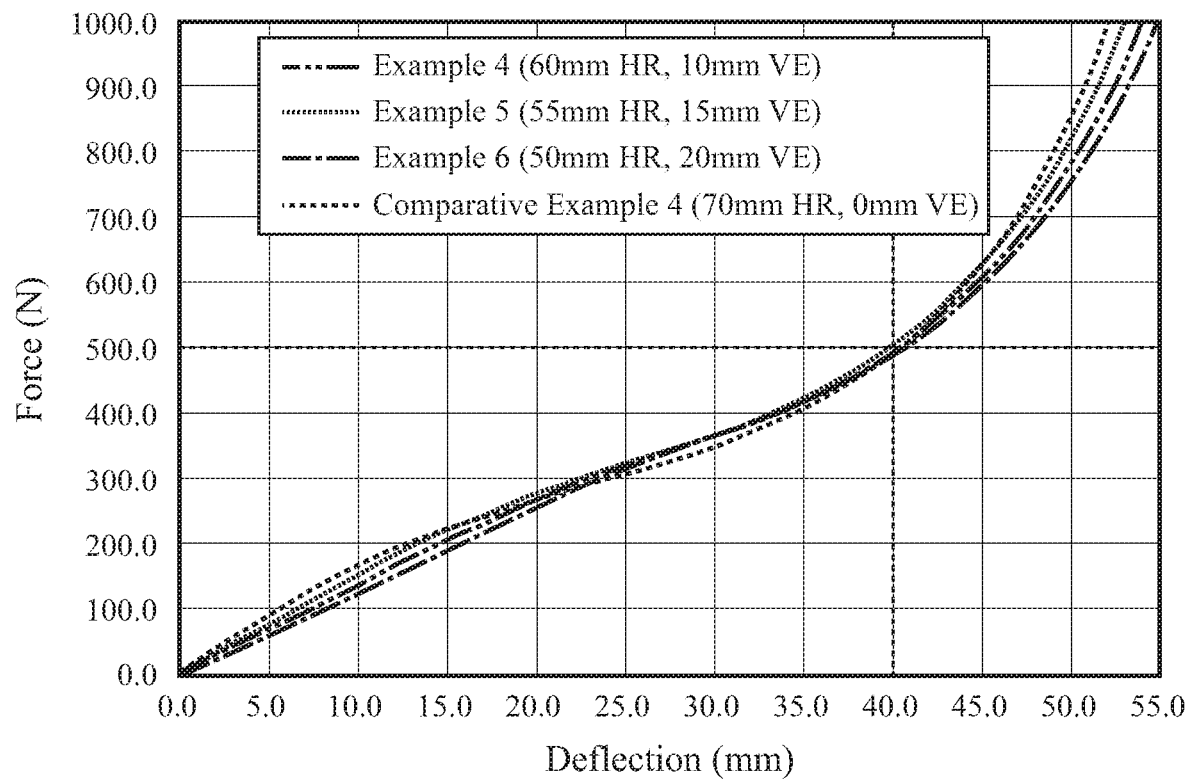
FIG. 10A is a graphical analysis of force vs. deflection of the composite foam article of the subject disclosure.
Figure 10B:
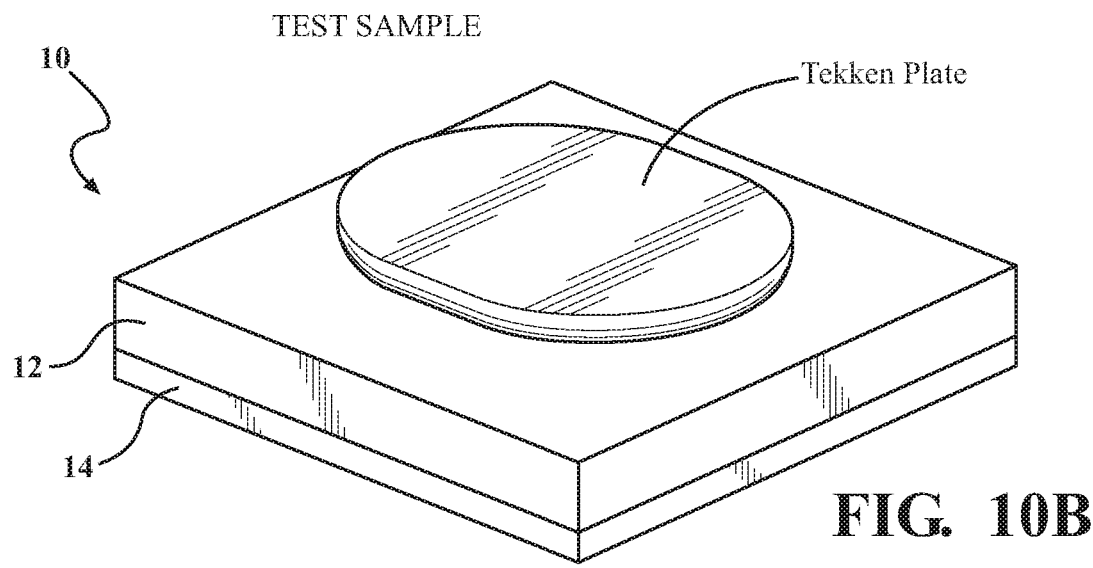
FIG. 10B is a perspective view of a test sample of the composite foam article used to generate the graphical analysis of FIG. 10A.

Referring now to FIG. 10A, FIG. 10A is a graphical analysis of force vs. deflection of the composite foam article of Examples 4-6 and Comparative Example 4. The graphical analysis is a Force-Deflection curve of CAE analysis data. Comparative Example 4 is a foam article comprising only HR foam, and is not in accordance with the subject disclosure, but is included for comparison purposes only. Testing is conducted with a Tekken plate and a 50 kg weight at a drop height of 40 mm on (sample size 400×400×70 mm) tested on a Zwick Static Materials Testing Machine at 500N in accordance with ASTM D3574-17 (sample size: 400×400×70; initial thickness speed: 50 mm/min; pre-compression speed: 50 mm/min; number of pre-compressions: 1-75%; saturation time after pre-compression: 60 sec; compression speed: 50 mm/min; measurement point: 25, 50, and 65%; and saturation time: 20 sec). FIG. 10B is a perspective view of a test sample of the composite foam article used to generate the graphical analysis of FIG. 10A.

Deflection, Spring Rate, Comfort Index Data for Examples 4-6 and Comparative Example 4 are set forth in Table 2 below.

TABLE 2

|  | Surface Layer $T_{HR}$ (mm) | Base Layer $T_{VE}$ (mm) | VE:HR Ratio | Deflection at 500N (mm) | Spring Rate at 500N (N/mm) | Comfort Index (N/mm²) |
|---|---|---|---|---|---|---|
| Target | — | — | — | — | <20 N/mm | <0.5 N/mm² |
| Example 4 | 60 | 10 | 0.17 | 39.59 | 19.64 | 0.496 |
| Example 5 | 55 | 15 | 0.27 | 40.17 | 19.49 | 0.485 |
| Example 6 | 50 | 20 | 0.4 | 40.4 | 18.37 | 0.455 |
| Comp. Ex. 4 | 70 | 0 | 0 | 40.28 | 22.44 | 0.557 |

Examples 7-11 are composite foam articles having a thickness of 70 mm, which include a surface layer comprising HR foam and a base layer comprising VE foam. A description of Examples 7-11 and Comparative Example 5 is set forth in Table 3 below.

TABLE 3

|  | Surface Layer $T_{HR}$ (mm) | Base Layer $T_{VE}$ (mm) | VE:HR Ratio |
|---|---|---|---|
| Example 7 | 50 | 20 | 0.4 |
| Example 8 | 45 | 25 | 0.56 |
| Example 9 | 40 | 30 | 0.75 |
| Example 10 | 35 | 35 | 1 |
| Example 11 | 30 | 40 | 1.33 |
| Comp. Ex. 5 | 70 | 0 | 0 |

Figure 11:
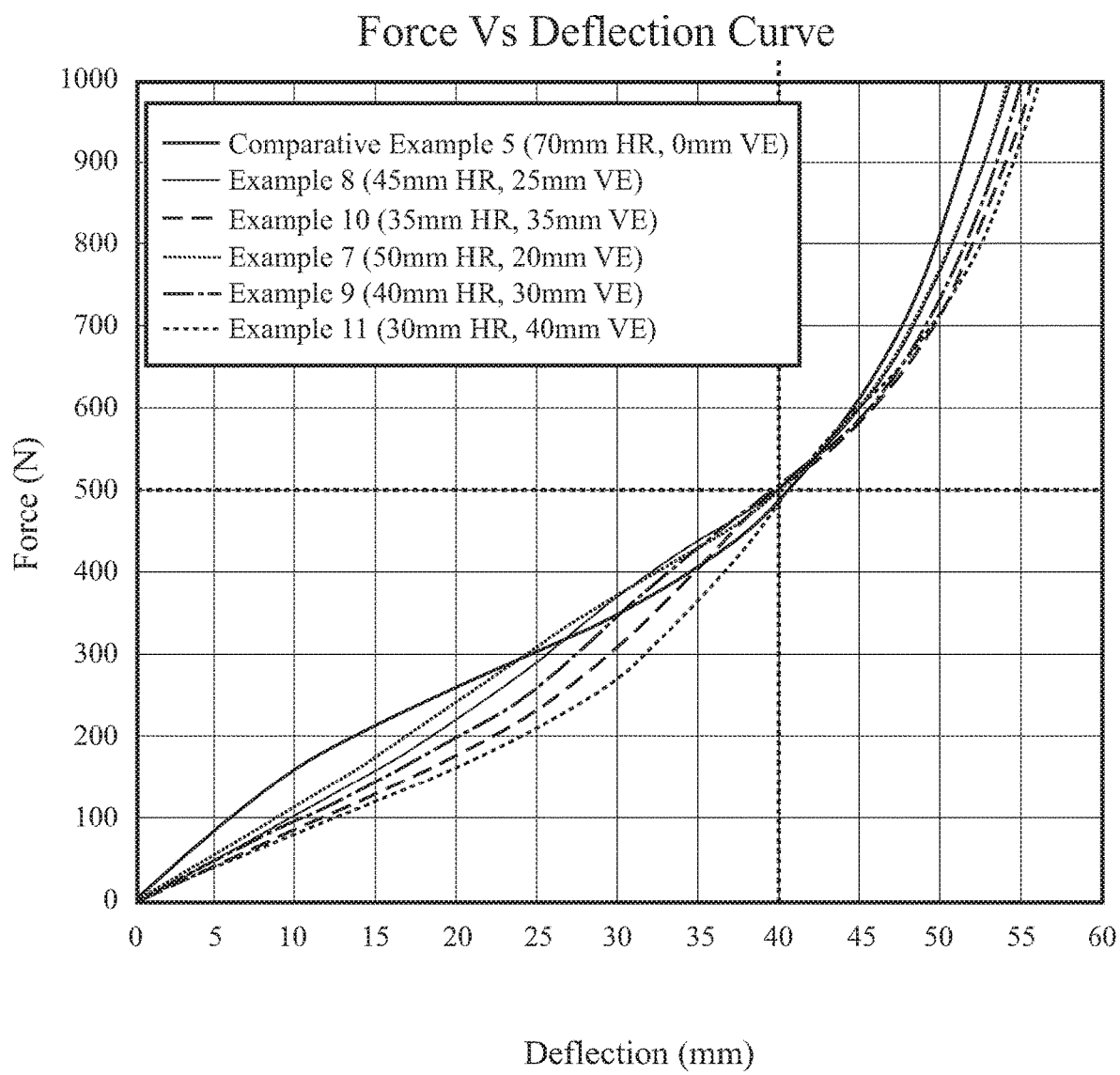
FIG. 11 is a graphical analysis of force vs. deflection of the composite foam article of the subject disclosure.

Referring now to FIG. 11, FIG. 11 is a graphical analysis of force vs. deflection of the composite foam article of Examples 7-11 and Comparative Example 5. Comparative Example 5 is a foam article comprising only HR foam, and is not in accordance with the subject disclosure, but is included for comparison purposes only. Testing is conducted with a Tekken plate and a 50 kg weight at a drop height of 40 mm on (sample size: 400×400×70 mm) tested on a Zwick Static Materials Testing Machine at 500N in accordance with ASTM D3574-17 (sample size: 400×400×70; initial thickness speed: 50 mm/min; pre-compression speed: 50 mm/min; number of pre-compressions: 1-75%; saturation time after pre-compression: 60 sec; compression speed: 50 mm/min; measurement point: 25, 50, and 65%; and saturation time: 20 sec). Comfort Index was calculated by Spring Rate/Deflection.

Deflection, Spring Rate, Comfort Index Data for Examples 7-11 and Comparative Example 5 are set forth in Table 4 below.

TABLE 4

|  | Surface Layer $T_{HR}$ (mm) | Base Layer $T_{VE}$ (mm) | VE:HR Ratio | HR CFD | Deflection at 500N (mm) | Spring Rate at 500N (N/mm) | Comfort Index (N/mm²) |
| --- | --- | --- | --- | --- | --- | --- | --- |
| Example 7 | 50 | 20 | 0.4 | 8.1 | 39.86 | 15.95 | 0.400 |
| Example 8 | 45 | 25 | 0.56 | 8.8 | 39.71 | 14.97 | 0.377 |
| Example 9 | 40 | 30 | 0.75 | 9.5 | 39.89 | 14.75 | 0.370 |
| Example 10 | 35 | 35 | 1 | 1.5 | 40.02 | 16.72 | 0.418 |
| Example 11 | 30 | 40 | 1.33 | 12.75 | 40.02 | 27.49 | 0.687 |
| Comp. Ex. 5 | 70 | 0 | 0 | 6.15 | 39.93 | 20.15 | 0.505 |

Figure 12:
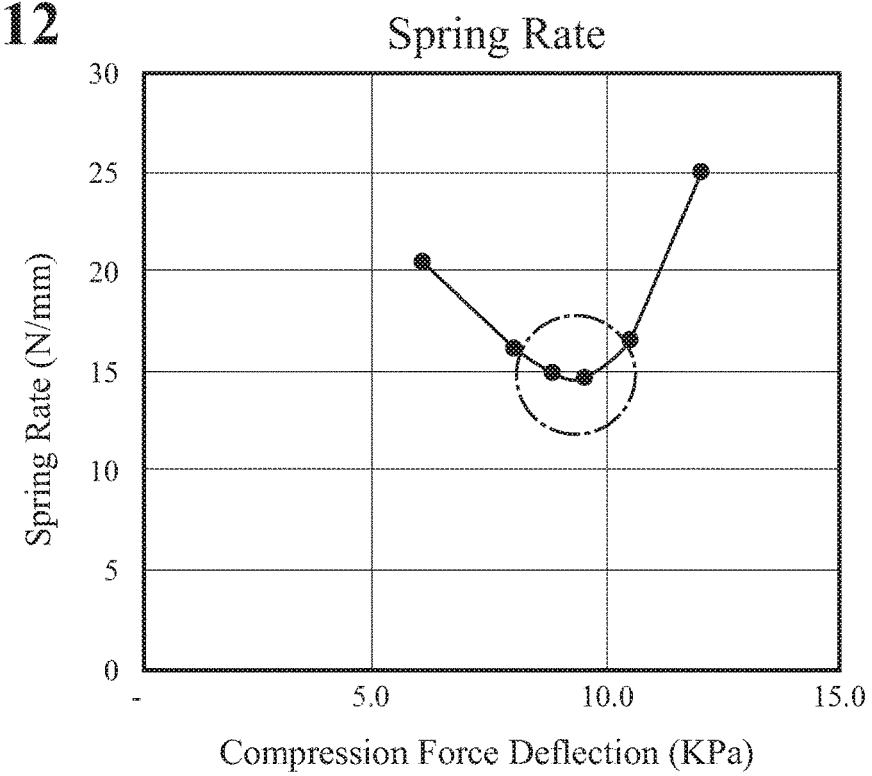
FIG. 12 is a graphical analysis of the Spring Rate at 500 N of Examples 7-11 and Comparative Example 5.
Figure 13:
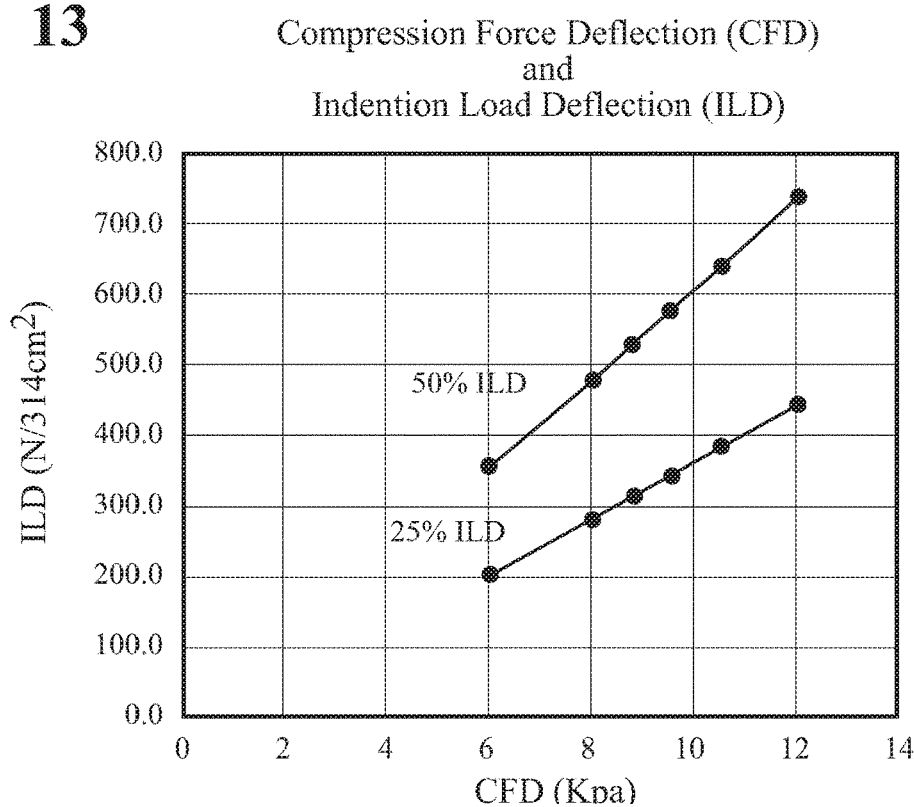
FIG. 13 is a graphical analysis of the Compression Force Deflection (CFD) and the Indention Load Deflection (ILD) of Examples 7-11 and Comparative Example 5.

Referring now to Table 4 above, the composite foam article of Examples 8 and 9 perform particularly well. In fact, FIGS. 12 and 13 indicate that thickness ratios (TS:TB) of from about 75:25 (0.33) to about 50:50 (1), based on the total thickness ($T_T$) of the composite foam article exhibit good performance properties, and thickness ratios (TS:TB) of from about 45:25 (0.56) to about 40:30 (0.75), based on the total thickness ($T_T$) of the composite foam article exhibit particularly good performance properties. In other words, the data of Table 4 and the graphs of FIGS. 12 and 13 indicate that the composite foam article exhibits excellent performance properties when the base layer is present having a thickness of from about 25 to about 50% of the total thickness of the composite foam article. Examples 8 and 9 are circled in FIG. 12 and illustrate the unexpectedly advantageous spring rate of the corresponding VE:HR ratios.

Examples 12 and 13 are composite foam articles having a thickness of 70 mm and 80 mm respectively. Examples 12 and 13 include a surface layer comprising HR foam and a base layer comprising VE foam. In contrast, Comparative Examples 6-8 are foam articles comprising only HR foam, and are not in accordance with the subject disclosure, but are included for comparison purposes only. A description of Examples 12 and 13 as well as Comparative Examples 6-8 is set forth in Table 5 below.

Referring now to Table 5 above, the composite foam articles of Examples 12 and 13 outperform Comparative Examples 6-8 from a comfort perspective.

Example 14 is a composite foam article having a thickness of 85 mm, which include a surface layer comprising HR foam and a base layer comprising VE foam. A description of Example 14 and Comparative Example 9 is set forth in Table 6 below.

TABLE 6

|  | Surface Layer $T_{HR}$ (mm) | Base Layer $T_{VE}$ (mm) | VE:HR Ratio |
| --- | --- | --- | --- |
| Example 14 | 51 | 34 | 0.67 |
| Comparative Example 9 | 103 | — | — |

Figure 14:
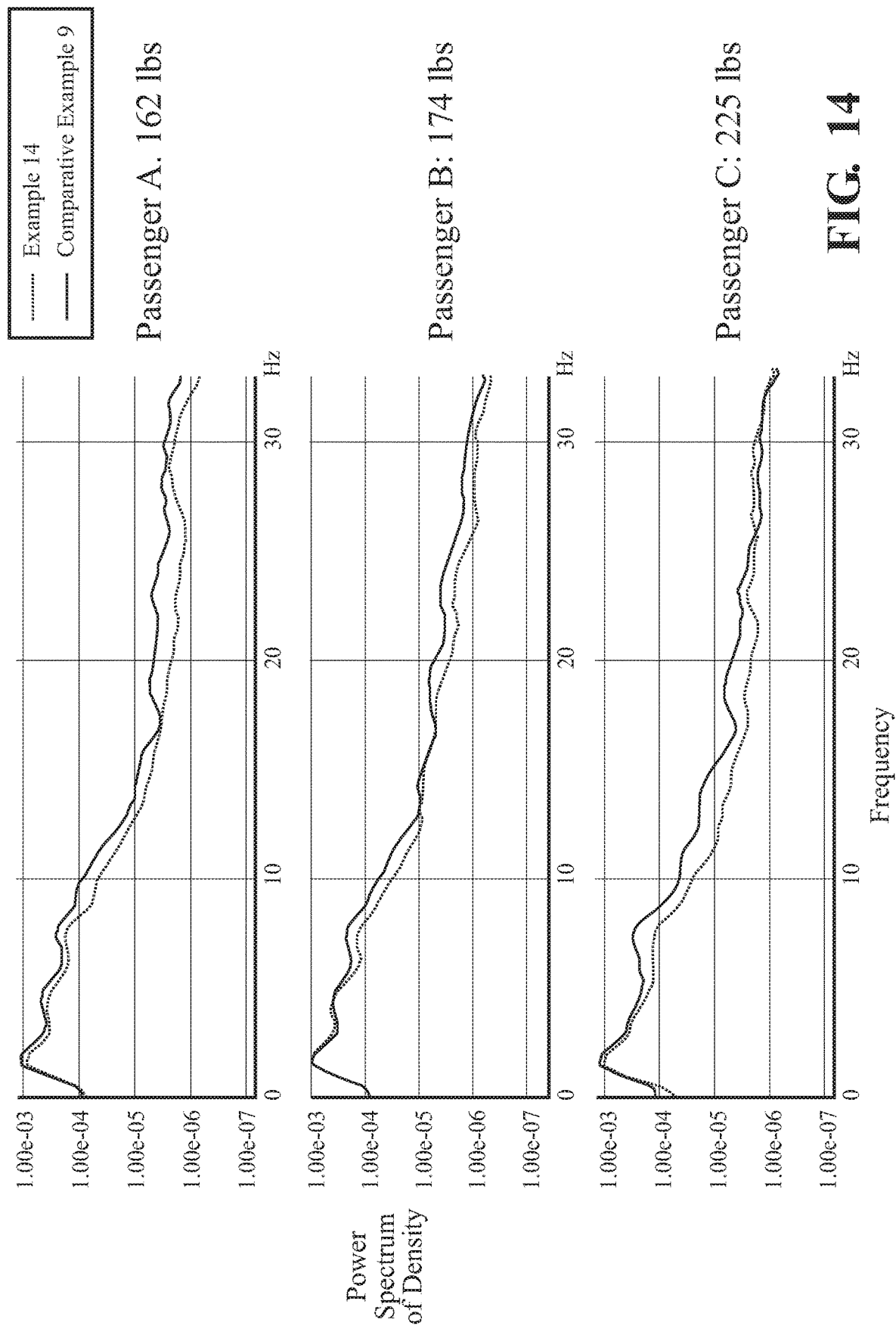
FIG. 14 is a graphical analysis of the Damping Performance of Example 14 and Comparative Example 9 with passengers/occupants of three different weights.

Referring now to FIG. 14, FIG. 14 is a graphical analysis of Power Spectrum of Density (PSD) vs. Frequency (Hz) of the composite foam article of Example 14 and Comparative Example 9. Still referring to FIG. 14, the lower the line relative to the Y axis, the better the damping performance. As is illustrated, the composite article of Example 14 outperforms the mono-layer article of Comparative Example 9, despite being 18 mm thinner. Furthermore, the damping performance of the composite foam article of Example 14 is better than the damping performance of Comparative Example 9 across a broad weight range.

It is to be understood that the appended claims are not limited to express any particular compounds, compositions, articles, or methods described in the detailed description, which may vary between particular embodiments that fall within the scope of the appended claims. With respect to any Markush groups relied upon herein for describing particular

TABLE 5

|  | Comparative Example 6 | Comparative Example 7 | Comparative Example 8 | Example 12 | Example 13 |
| --- | --- | --- | --- | --- | --- |
| Description | Standard HR Foam | Standard HR Foam | High Performance HR Foam | HR Surface Layer/VE Base Layer | HR Surface Layer/VE Base Layer |
| Notes: | Current Market Leader | Current Market Leader | HR Foam Developed Comfort at Reduced Thickness | Counter-intuitive VE Layer on seat Frame | Counter-intuitive VE Layer on seat Frame |
| Thickness (mm) | 100 | 70 | 50 | 70 (50/20) | 80 (50/30) |
| Bottoming | No | Yes | Yes | No | No |
| Comfort | Good | Poor | Poor | Good | Good | features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the instant disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the instant disclosure, and such ranges and subranges may be further delineated into relevant halves, thirds, quarters, fifths, and so on. The instant disclosure has been described in an illustrative manner, and it is to be understood that the terminology which has been used is intended to be in the nature of words of description rather than of limitation. Obviously, many modifications and variations of the instant disclosure are possible in light of the above teachings. It is, therefore, to be understood that within the scope of the appended claims, the instant disclosure may be practiced otherwise than as specifically described.

What is claimed is:

1. A composite foam article comprising:
    a surface layer comprising a high-resiliency polyurethane foam having an impact resilience of greater than about 50% when tested in accordance with ASTM D3574-17, and presenting an occupant support surface;
    a base layer comprising a viscoelastic polyurethane foam having an impact resilience of less than about 50% when tested in accordance with ASTM D3574-17, and presenting a mounting surface opposite said occupant support surface; and
    an interface between said surface layer and said base layer;
    wherein said surface layer and said base layer are present in a thickness ratio of from about 17:3 to about 2:3.

2. The composite foam article as set forth in claim 1 wherein said surface layer and said base layer are present in a thickness ratio of from about 3:1 to about 1:1.

3. The composite foam article as set forth in claim 2 having a total thickness of from about 70 to about 90 mm.

4. The composite foam article as set forth in claim 3 wherein said surface layer has a greater density than said base layer.

5. The composite foam article as set forth in claim 1 having a total thickness of from about 70 to about 90 mm.

6. The composite foam article as set forth in claim 5 wherein from about 25 to about 50% of said total thickness is contributed by a thickness of said base layer.

7. The composite foam article as set forth in claim 1 wherein said surface layer has a greater density than said base layer.

8. The composite foam article as set forth in claim 1 wherein said surface layer has a greater support factor than said base layer when tested in accordance with ASTM D3574-17.

9. The composite foam article as set forth in claim 1, wherein said high-resiliency polyurethane foam has a support factor of from about 2 to about 3, when tested in accordance with ASTM D3574-17.

10. The composite foam article as set forth in claim 1, wherein said high-resiliency polyurethane foam has impact resilience of greater than about 55% when tested in accordance with ASTM D3574-17.

11. The composite foam article as set forth in claim 1 wherein said high-resiliency polyurethane foam has an Indentation Load Deflection of from about 300 to about 600 N/314 cm$^2$ when tested in accordance with ASTM D3574-17.

12. The composite foam article as set forth in claim 1 wherein said high-resiliency polyurethane foam has a Compression Force Deflection of from about 5 to about 10 kPa when tested in accordance with ASTM D3574-17.

13. The composite foam article as set forth in claim 1 wherein said viscoelastic polyurethane foam has an Indentation Load Deflection of from about 50 to about 200 N/314 cm$^2$ when tested in accordance with ASTM D3574-17.

14. The composite foam article as set forth in claim 1 wherein said viscoelastic polyurethane foam has a Compression Force Deflection of from about 1 to about 5 kPa when tested in accordance with ASTM D3574-17.

15. The composite foam article as set forth in claim 1 further comprising an adhesive layer at said interface.

16. The composite foam article as set forth in claim 1 further comprising a sub-layer comprising a mixture of high-resiliency and viscoelastic polyurethane foam and having a thickness of from about 0.1 to about 2 mm.

17. The composite foam article as set forth in claim 1 having a damping value from about 1.0 to about 2.5 when tested at a thickness of 70 mm and in accordance with ISO 3386-1: 1986.

18. The composite foam article as set forth in claim 1 having a spring rate of from about 10 to about 20 N/mm when tested at a thickness of 70 mm and in accordance with ASTM 3574-17.

19. The composite foam article as set forth in claim 1 having a support factor of from about 0.4 to about 3.0 N/mm$^2$ when tested at a thickness of 70 mm and in accordance with ASTM 3574-17.

20. The composite foam article as set forth in claim 1 wherein said surface layer has a density of from about 45 to about 70 kg/m$^3$.

21. The composite foam article as set forth in claim 1 wherein said base layer has a density of from about 45 to about 60, kg/m$^3$, when tested in accordance with ASTM D3574-17.

22. The composite foam article as set forth in claim 1 wherein from about 25 to about 50% of a total thickness of said composite foam article is contributed by a thickness of said base layer.

* * * * *